(12) United States Patent
Samluk et al.

(10) Patent No.: US 9,090,003 B2
(45) Date of Patent: Jul. 28, 2015

(54) MOLDED-IN-COLOR VEHICLE PANEL AND MOLD

(75) Inventors: Michael Alan Samluk, New Hudson, MI (US); LaRon Brown, Detroit, MI (US); Stanley Staniszewski, Grosse Pointe Woods, MI (US); Richard Jerome Roberts, Clinton Township, MI (US)

(73) Assignees: Ford Global Technologies, LLC, Dearborn, MI (US); I-Fusion Technology, Inc., Clinton, MI (US)

( * ) Notice: Subject to any disclaimer, the term of this patent is extended or adjusted under 35 U.S.C. 154(b) by 629 days.

(21) Appl. No.: 12/904,746

(22) Filed: Oct. 14, 2010

(65) Prior Publication Data

US 2011/0024941 A1  Feb. 3, 2011

Related U.S. Application Data

(62) Division of application No. 11/673,704, filed on Feb. 12, 2007, now abandoned.

(51) Int. Cl.
*B29C 45/00* (2006.01)
*B29C 45/17* (2006.01)
*B29C 45/14* (2006.01)

(52) U.S. Cl.
CPC ... *B29C 45/0053* (2013.01); *B29C 2045/14147* (2013.01)

(58) Field of Classification Search
CPC ............ B29C 45/0033; B29C 45/0053; B29C 2045/0093; B29C 2045/14147; B29C 2045/14901; B29C 39/10; B60R 13/02
USPC ....................................................... 264/155
See application file for complete search history.

(56) References Cited

U.S. PATENT DOCUMENTS

| | | |
|---|---|---|
| 3,909,175 A | 9/1975 | Gemmill |
| 4,039,215 A | 8/1977 | Minhinnick |
| 4,403,933 A | 9/1983 | Davis et al. |
| 4,832,593 A | 5/1989 | Brown |

(Continued)

FOREIGN PATENT DOCUMENTS

| | | |
|---|---|---|
| DE | 10059160 A1 | 8/2001 |
| DE | 10143564 A1 | 3/2003 |

(Continued)

OTHER PUBLICATIONS

Solvay Press Offce. "United States: Solvey Engineered Polymers Innovates." Feb. 14, 2000. Solvay S.A.*

(Continued)

*Primary Examiner* — Philip Tucker
*Assistant Examiner* — Vicki Wu
(74) *Attorney, Agent, or Firm* — Damian Porcari; Brooks Kushman P.C.

(57) ABSTRACT

In one embodiment a method for creating a molded-in-color vehicle panel is provided. The mold may have at least first and second mold members, each having a forming surface for forming a portion of the vehicle panel. One mold member may translate relative to the other to collectively receive a heated resin with a molded-in-color to form the vehicle panel. The resin may be formed into a solid molded-in-color interior vehicle panel. After allowing the resin to partially cool, an aperture may be formed by punching through in the molded-in-color resin with a punch.

18 Claims, 3 Drawing Sheets

(56) References Cited

U.S. PATENT DOCUMENTS

| | | |
|---|---|---|
| 5,037,680 A | 8/1991 | Papendick et al. |
| 5,069,833 A * | 12/1991 | Yokoi et al. .................. 264/442 |
| 5,178,051 A * | 1/1993 | Smith et al. ..................... 83/685 |
| 5,342,666 A | 8/1994 | Ellison et al. |
| 5,851,558 A | 12/1998 | Atake |
| 5,960,527 A | 10/1999 | Ellison et al. |
| 5,985,198 A | 11/1999 | Harris et al. |
| 6,165,407 A | 12/2000 | Tahara et al. |
| 6,168,231 B1 | 1/2001 | Fielding et al. |
| 6,319,438 B1 | 11/2001 | Smith et al. |
| 6,468,458 B1 | 10/2002 | Anderson et al. |
| 6,719,938 B2 | 4/2004 | Summerer |
| 6,838,027 B2 | 1/2005 | Brodi, Jr. et al. |
| 7,005,103 B2 | 2/2006 | Smith et al. |
| 7,108,311 B2 | 9/2006 | Dooley et al. |
| 7,129,439 B2 | 10/2006 | Itakura et al. |
| 2003/0080540 A1 | 5/2003 | Kinane |
| 2004/0169396 A1* | 9/2004 | Dooley et al. .............. 296/146.7 |
| 2004/0232303 A1 | 11/2004 | Rausch et al. |
| 2005/0082712 A1 | 4/2005 | Brodi, Jr. et al. |
| 2005/0127565 A1 | 6/2005 | Wilson et al. |
| 2005/0202210 A1 | 9/2005 | Schulthess |
| 2005/0217790 A1 | 10/2005 | Joachimi et al. |
| 2005/0252714 A1 | 11/2005 | Goda et al. |
| 2005/0285303 A1 | 12/2005 | Balint et al. |
| 2006/0024476 A1 | 2/2006 | Leland et al. |
| 2006/0030650 A1 | 2/2006 | Koshida et al. |
| 2006/0043631 A1 | 3/2006 | Lang et al. |
| 2006/0068193 A1 | 3/2006 | Cowelchuk et al. |
| 2006/0068206 A1 | 3/2006 | Hala et al. |
| 2007/0007788 A1* | 1/2007 | Araga et al. ................. 296/39.3 |
| 2007/0126138 A1 | 6/2007 | Dooley et al. |
| 2007/0221352 A1 | 9/2007 | Manda |
| 2008/0191379 A1 | 8/2008 | Samluk et al. |
| 2008/0318051 A1 | 12/2008 | Brown et al. |
| 2008/0318052 A1 | 12/2008 | Brown et al. |
| 2009/0315218 A1 | 12/2009 | Izumo |
| 2010/0084842 A1 | 4/2010 | Kong |
| 2010/0295216 A1 | 11/2010 | Shin et al. |
| 2011/0233821 A1 | 9/2011 | Bando et al. |
| 2011/0304069 A1 | 12/2011 | Etoh et al. |
| 2012/0049408 A1 | 3/2012 | Okamoto |
| 2012/0114973 A1 | 5/2012 | Jacobsen et al. |

FOREIGN PATENT DOCUMENTS

| | | |
|---|---|---|
| EP | 1112831 A1 | 7/2001 |
| EP | 1382433 A1 | 1/2004 |
| EP | 1564067 A1 | 8/2005 |
| EP | 1849596 A1 | 10/2007 |
| EP | 1882636 A2 | 1/2008 |
| EP | 1990486 A1 | 11/2008 |
| FR | 2876945 A1 | 4/2006 |
| JP | S63-163009 A | 6/1988 |
| JP | H09-174607 A | 7/1997 |
| JP | H11-334418 A | 12/1999 |
| JP | 2000-085355 A | 3/2000 |
| JP | 2001-225387 A | 8/2001 |
| JP | 2002-018908 A | 1/2002 |
| JP | 2002225139 A | 8/2002 |
| JP | 3358915 B2 | 12/2002 |
| JP | 2005-067529 A | 3/2005 |
| JP | 2005-279990 A | 10/2005 |
| JP | 2005-306310 A | 11/2005 |

OTHER PUBLICATIONS

Colleen Northeim, Mary W. Moore and John L. Warren, Surface-Coating-Free Materials Workshop Summary Report, Center for Environmental Analysis, Center for Environmental Analysis, EPA 600R-92-159, Aug. 1992.

Advanced Composites, Material Processing Guidelines and Troubleshooting Guide, ACP 2004, 2005) Last Update Mar. 3, 2005.

Solvay Press Office, United States: Solvay Engineered Polymers Innovates, Development of a mold-in-color metallic engineered polyolefin, Feb. 14, 2000, http://www.solvaypress.com/pressreleases/0,,64-2-0,00.htm.

Office Action for copending U.S. Appl. No. 11/766,812, mailed May 27, 2010, 13 pages.

European Office Action dated Oct. 19, 2009 (corresponding EP Appn. No. 0 815 7984.9), 3 pages.

Office Action for copending U.S. Appl. No. 11/673,704, mailed Feb. 6, 2009, 11 pages.

Office Action for copending U.S. Appl. No. 11/673,704, mailed Jul. 14, 2010, 7 pages.

Office Action for copending U.S. Appl. No. 11/673,704, mailed Jul. 17, 2009, 9 pages.

Office Action for copending U.S. Appl. No. 11/673,704, mailed Jan. 6, 2010, 10 pages.

Office Action for copending U.S. Appl. No. 11/766,812, mailed Jun. 25, 2009, 14 pages.

Office Action for copending U.S. Appl. No. 11/766,812, mailed Jan. 20, 2010, 21 pages.

Office Action for copending U.S. Appl. No. 11/766,813, mailed Oct. 28, 2009, 12 pages.

Office Action for copending U.S. Appl. No. 11/766,813, mailed Apr. 1, 2009, 12 pages.

Non-Final Office Action mailed Nov. 4, 2011, U.S. Appl. No. 12/868,294, filed Aug. 25, 2010, 30 pgs.

Final Office Action mailed Dec. 14, 2010 from copending U.S. Appl. No. 11/766,813, filed Jun. 22, 2007, 17 pages.

Office Action dated Aug. 6, 2012 in EP Appn. No. 08 157 984.9, filed Jun. 10, 2008, 6 pgs.

Final Office Action mailed Jul. 16, 2012 in U.S. Appl. No. 12/868,294, filed Aug. 25, 2010, 21 pages.

* cited by examiner

US 9,090,003 B2

MOLDED-IN-COLOR VEHICLE PANEL AND MOLD

CROSS-REFERENCE TO RELATED APPLICATIONS

This application is a division of U.S. application Ser. No. 11/673,704 filed Feb. 12, 2007 now abandoned; the disclosure of which is incorporated in its entirety by reference herein.

BACKGROUND OF THE INVENTION

1. Field of the Invention

The multiple embodiments of the present invention relate to molded-in-color vehicle panels and molds for creating molded-in-color vehicle panels.

2. Background Art

Vehicle panels, which may be on the interior or exterior of a vehicle, commonly have surfaces which are exposed to a viewable environment. These exposed surfaces are often referred to as class-A surfaces. It is desirable to create these class-A surfaces to have few surface defects or flaws when compared to non class-A surfaces. Since class-A surfaces, or appearance surfaces, are exposed to a viewable environment, these surfaces are formed using tighter tolerances and greater detail. Non class-A surfaces, or concealed surfaces are not exposed in the viewable environment and may have visible surface defects and flaws.

When vehicle panels are formed using injection, compression, or vacuum molding, class-A surfaces without defects are difficult to create because of the appearance of knit and mold flow lines. Since surface defects such as these are difficult to eliminate and/or control using injection, compression, or vacuum molding, vehicle panels with class-A surfaces are not typically injection, compression, or vacuum molded unless the vehicles are painted in a secondary painting operation, covering the surface defects.

Painting the vehicle panel in a secondary painting operation requires additional time and cost to create the vehicle panel. Paint is also susceptible to peeling, chipping, blistering and/or delamination. Therefore, molded-in-color plastics provide an alternative for use in creating a vehicle panel.

Molded-in-color plastics are a lower cost option for programs to consider instead of current painted technologies and/or other decorative alternatives, such as paint film or ink laminates. Molded-in-color plastics are also environmentally friendly. Although molded-in-color plastics offer these benefits, it is still extremely difficult to mold parts in color without visible appearance of knit and mold flow lines on a class-A surface.

When a vehicle panel is designed with holes formed through the body of the panel, creating a defect-free class-A surface is difficult and often expensive even when using molded-in-color plastic. Injection, compression, or vacuum molding the vehicle panel with holes is difficult because of the visible appearance of knit and mold flow lines on the class-A surface. A secondary cutting operation is often performed on the vehicle panel to create the holes. A secondary cutting operation requires additional time and cost to produce the vehicle panel.

SUMMARY OF THE INVENTION

In one embodiment, the mold has a first mold member having a first forming surface for forming a portion of the vehicle panel. The mold is provided with at least a second mold member having a second forming surface for forming another portion of the vehicle panel. The second mold member is translatable relative to the first mold member to collectively receive a heated resin with molded-in-color to form the vehicle panel. At least one punch is provided within one of the first or second mold members. The at least one punch is actuatable to extend through the forming surface of the one of the first or second mold members and to extend through a nest to nest in the forming surface of the other of the first or second mold members for forming an aperture through a partially cooled vehicle panel.

In yet another embodiment, a method for creating a molded-in-color vehicle panel is provided. The method provides for injecting molded-in-color resin into the mold, partially cooling the molded-in-color resin, and punching at least one aperture through the partially cooled molded-in-color resin in the mold.

In another embodiment, a molded-in-color vehicle panel is provided. The molded-in-color vehicle panel formed by injecting molded-in-color resin into the mold, partially cooling the molded-in-color resin, and punching at least one aperture through the partially cooled molded-in-color resin in the mold.

These and other desired objects of the embodiments will become more apparent in the course of the following detailed description and claims.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
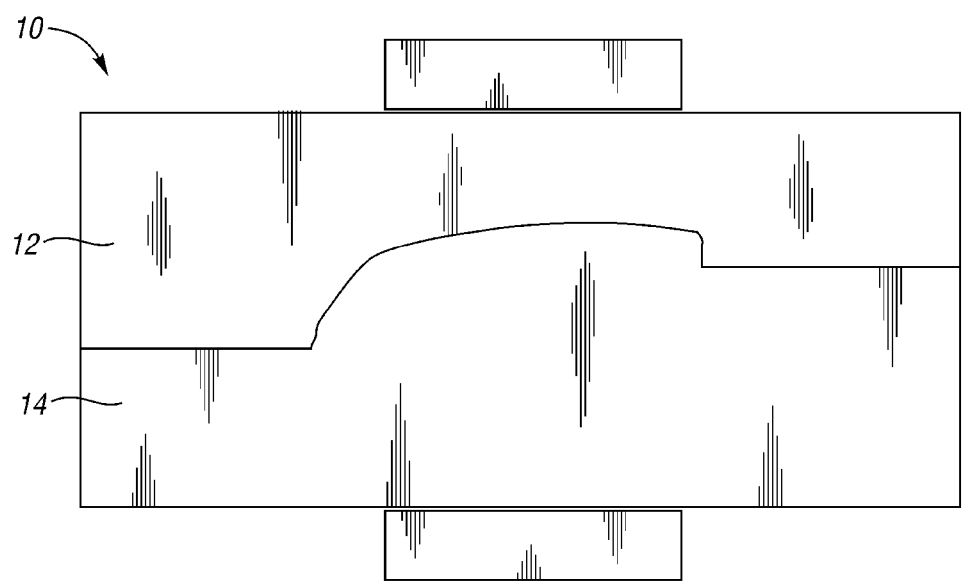
FIG. 1 is a side elevation view of a mold in accordance with the present invention.

Referring to FIG. 1, a mold for creating a molded-in-color vehicle panel is illustrated and referenced generally by numeral 10. The mold 10 has a first mold half 12 and a second mold half 14. In another embodiment, the mold 10 may have three or more mold portions which collectively form the mold 10. Any number of mold portions are contemplated within the scope of the present invention.

In one embodiment, the first mold half 12 referred to as a cavity because the first mold half 12 may have a substantial recess for receiving the second mold half 14. The second mold half 14 may be referred to as a core because the second mold half 14 may have a substantial projection which is received in the cavity 12.

The core 14 may be moveable relative to the cavity 12. By providing a stationary cavity 12 and a moveable core 14, a vehicle panel may be retained within the mold 10 on the core 14 after molding the vehicle panel which may be generally easily ejected or removed after the mold 10 is opened. It is also contemplated within the scope of the present invention that the cavity 12 may be moveable while the core 14 is stationary. If three or more mold portions are employed, at least one mold portion may be moveable relative to at least a second mold portion.

Figure 2:
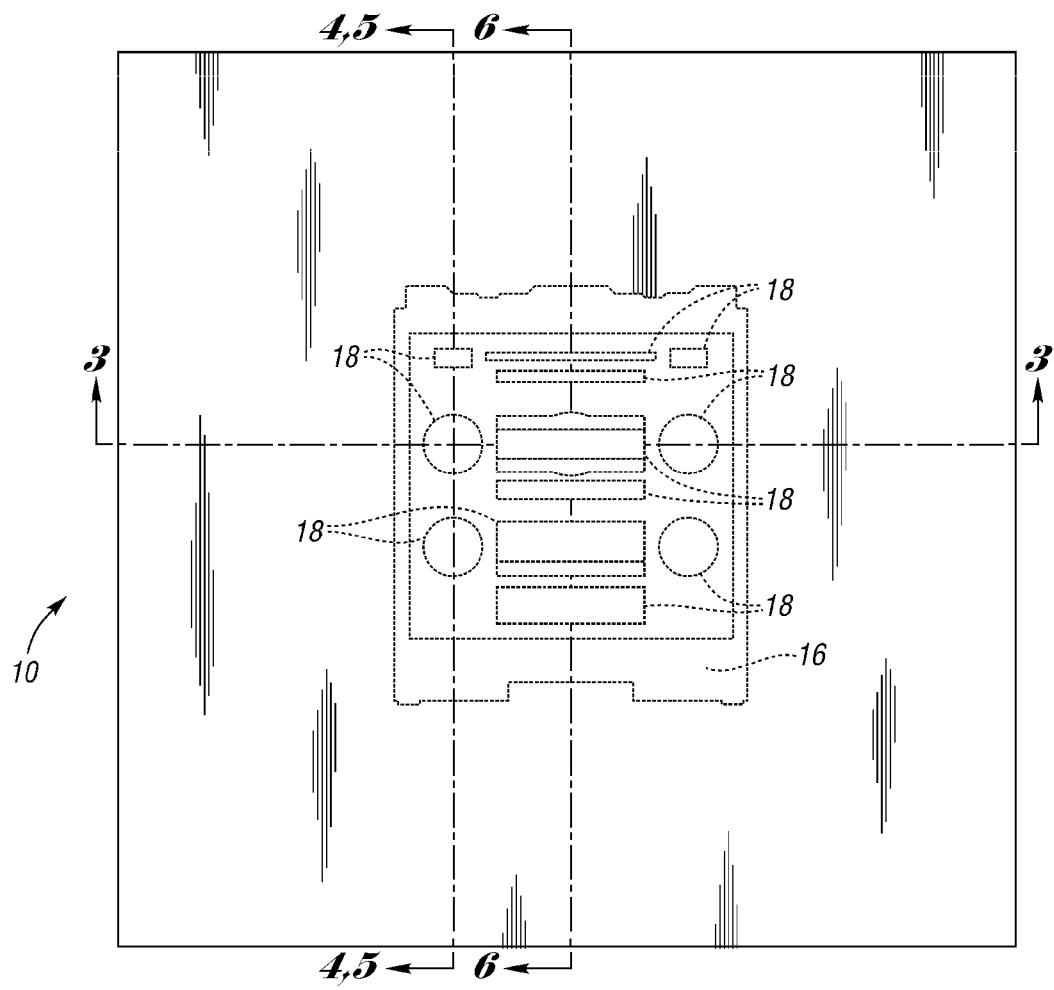
FIG. 2 is top plan view of the mold of FIG. 1.

Referring now to FIG. 2, a top plan view of the mold 10 of FIG. 1 is illustrated. To create a vehicle panel 16, a heated resin may be injected into the mold 10 through a resin inlet.

The resin which is heated, may have molded-in-color so that no secondary painting operation is required. In another embodiment, the heated resin and the colorant may be separately injected into the mold 10. The resin may have material properties comparable with a polycarbonate-acrylonitrile butadiene styrene (PC/ABS). The resin may also contain metallic molded-in-color for vehicle panel applications for use in the interior of the vehicle, for example. The metallic molded-in-color resin may achieve a low gloss, quality, metallic appearance once injection, compression, or vacuum molded, without secondary paint operations. The resulting vehicle panel will deliver enhanced metallic appearance over paint and offer a low cost option to using aluminum and/or decorative films.

The injected heated resin takes the shape of the vehicle panel 16 without any holes 18 formed through the vehicle panel 16. When the vehicle panel 16 is partially cooled within the mold 10, at least one hole 18 may be punched through the vehicle panel 16. In one embodiment, the temperature of the partially cooled vehicle panel 16 may be less than a melting temperature and near an plasticizing temperature of the vehicle panel 16. The temperature may be lower than the melting temperature because the vehicle panel 16 should not be liquid while the punching is preformed. The temperature may be near a plasticizing temperature of the vehicle panel 16, which is near the softening point of the material used to form the vehicle panel 16. The vehicle panel 16 may be punched before the panel 16 is fully cooled to avoid internal stresses which are formed when punching a fully cooled vehicle panel. Any number of holes 18 may be punched through the vehicle panel 16 in accordance with a desired design for the vehicle panel 16.

Figure 3:
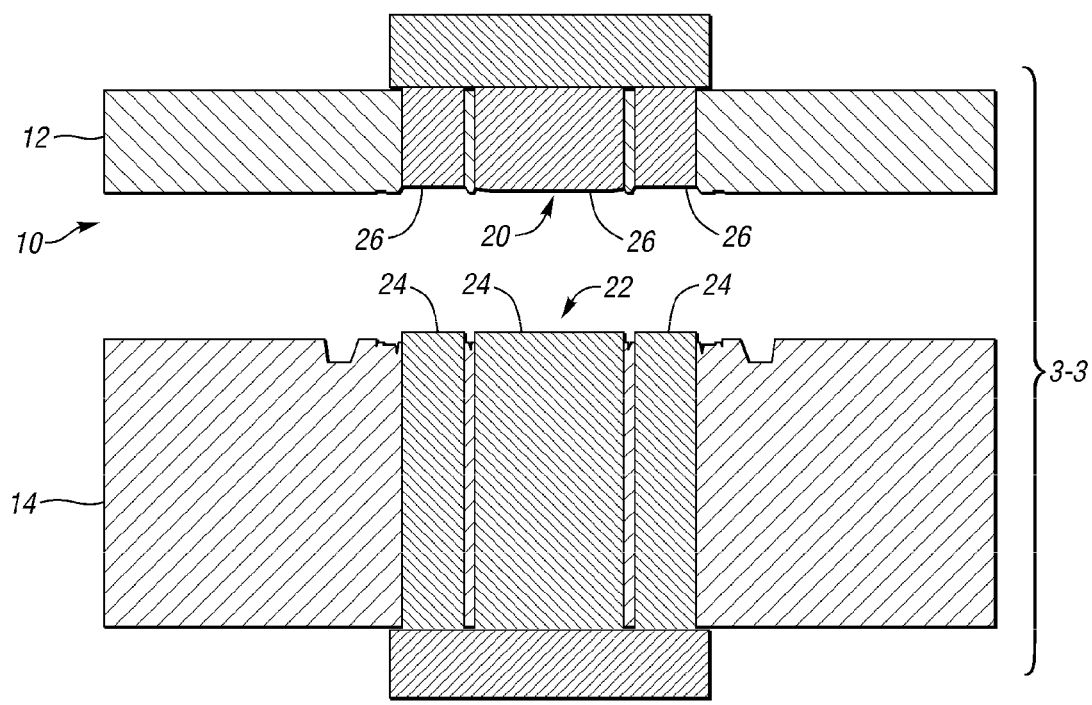
FIG. 3 is a cross-section of the mold of FIG. 2 along the line 3-3.
Figure 4:
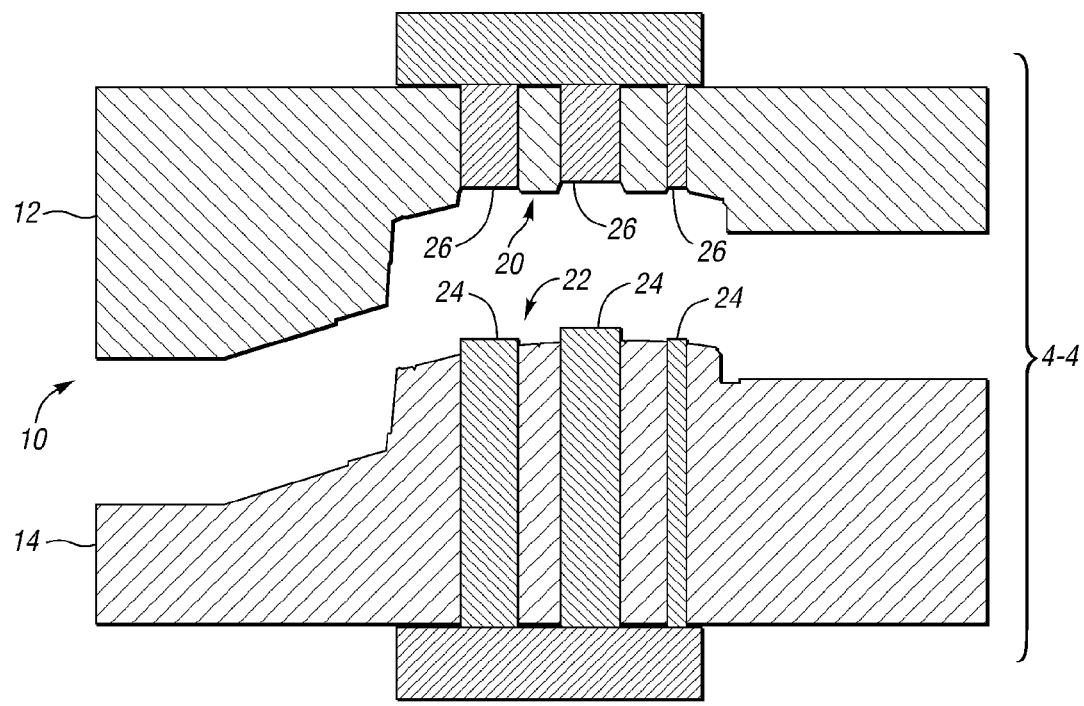
FIG. 4 is another cross-section of the mold of FIG. 2 taken along the line 4-4.

Referring now to FIGS. 3 and 4, the mold 10 is illustrated in cross-section taken along the lines 3-3 and 4-4, respectively. The mold 10 has a cavity 12 which is stationary and a core 14 which is moveable relative to the cavity 12. The cavity 12 may also be moveable relative to the core 14. The mold 10 is illustrated in an open position which may occur before a vehicle panel is formed or after a vehicle panel is formed.

The cavity 12 has a first forming surface 20 for receiving a second forming surface 22 of the core 14. The first forming surface 20 and the second forming surface 22 collectively provide an outer boundary for a vehicle panel. The first forming surface 20 and second forming surface 22 may define an appearance forming surface and a concealed forming surface respectively. In another embodiment, three or more forming surfaces are provided to collectively define the outer boundary of a vehicle panel.

The core 14 may have at least one punch 24. Although three punches 24 are illustrated in this view of the present embodiment, any number of punches 24 is contemplated within the scope of the present invention. When the mold 10 is in the open position as illustrated, the punches 24 are in a first, non-extended position. After a heated resin is injected into the mold 10 and partially cooled, the punches 24 extend through the second forming surface 22, through the partially cooled vehicle panel and into the first forming surface 20. Once the punch 24 extends through the partially cooled vehicle panel and into the receiver 26, a hole is formed through the vehicle panel, which eliminates the need for a secondary cutting or punching operation for the vehicle panel.

The first forming surface 20 may be provided with at least one receiver 26 to receive at least one corresponding punch 24. The receiver 26 allows the punch 24 to extend through the first forming surface 20. Three receivers 26 are illustrated which correspond with the three punches 24. Any number of receivers 26 are contemplated within the scope of the present invention.

Figure 5:
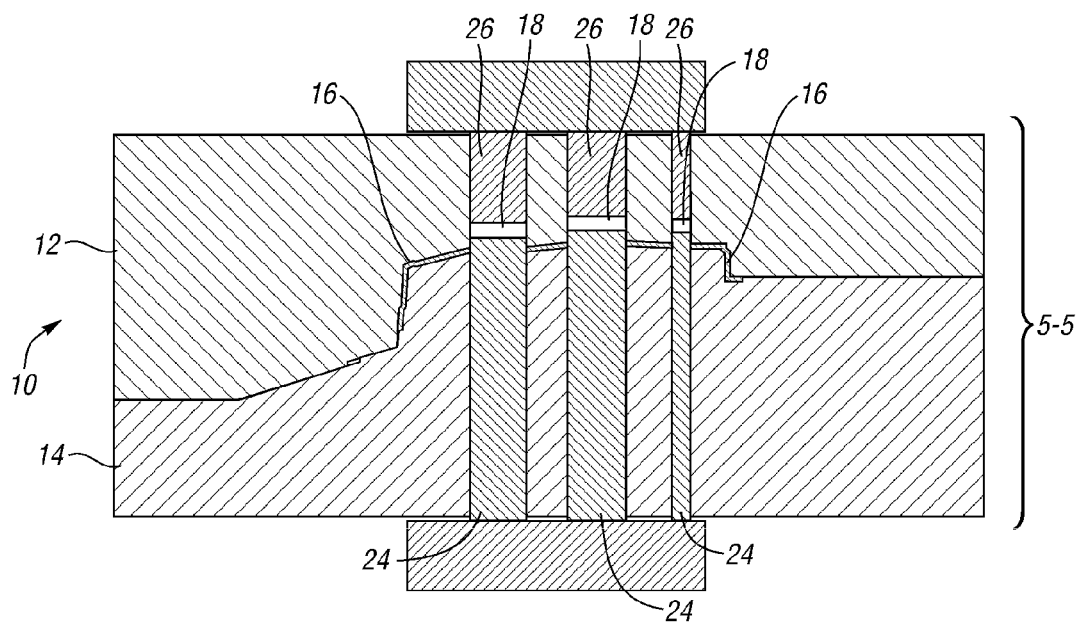
FIG. 5 is yet another cross-section view of the mold of FIG. 2 taken along the line 5-5.

Referring now to FIG. 5, the mold 10 is illustrated in cross-section taken along the line 5-5, which corresponds with the cross-section of FIG. 4. The mold 10 is illustrated in a closed position, after heated resin has been injected. Once the heated resin has partially cooled, the punches 24 extend through the partially cooled resin into the receiver 26 forming holes 18 through the vehicle panel 16. The cavity 14 may then move linearly away from the core 12, as illustrated in FIG. 6, so that the vehicle panel 16 may be ejected or removed from the mold 10.

Figure 6:
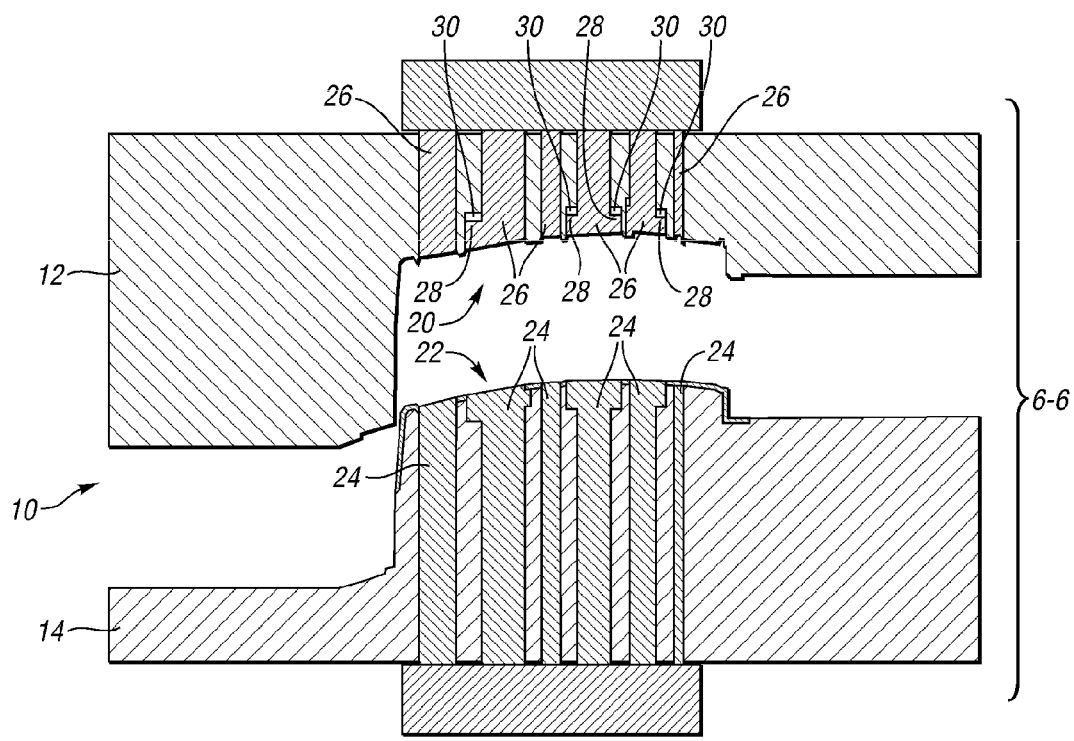
FIG. 6 is another cross-section view of the mold of FIG. 2 taken along the line 6-6.

Referring now to FIG. 6, the receiver 26 may be provided with at least a shoulder 28. If a shoulder 28 is provided on the receiver 26, a shoulder aperture 30 may be provided to receive the shoulder 28 when the punch 24 is nested within the receiver 26. The shoulder 28 may provide a stop for the linear translation of the punch 24 and the receiver 26. The shoulder 28 may decrease the force required to move the receiver 26 by decreasing the total weight of the receiver 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for creating a molded-in-color vehicle panel, the method comprising:
    providing a mold having a first mold member and a second mold member wherein one of the first mold member and the second mold member has an appearance-forming surface for forming an appearance portion of the panel, and the other of the first mold member and the second mold member has a concealed-forming surface for forming a concealed portion of the panel;
    providing a translatable receiver in the first mold member movable between a first position and a second position, wherein in the first position, a receiver surface is adjacent the appearance-forming surface of the first mold member;
    providing a punch in the second mold member adjacent the concealed-forming surface;
    positioning the receiver in the first position in preparation of injection molding;
    injecting molded-in-color resin in the mold;
    partially cooling the molded-in-color resin into a solid molded-in-color interior vehicle panel;
    punching at least one aperture through the partially cooled molded-in-color resin in the mold with the punch; and receiving the punch in the receiver, wherein the receiver is provided with at least one shoulder to stop linear translation of the punch and the receiver is in the second position when the receiver receives the punch;

wherein ideal surface characteristics of the appearance portion of the panel are maintained while forming the at least one aperture so that the appearance portion of the panel is generally free of visible appearance defects.

2. The method of claim 1 further comprising cooling the partially cooled molded-in-color resin to a solid vehicle panel.

3. A method for creating a molded-in-color vehicle, the method comprising:

providing a mold having a first mold member and a second mold member wherein one of the first mold member and the second mold member has an appearance-forming surface for forming an appearance portion of the panel, and the other of the first mold member and the second mold member has a concealed-forming surface for forming a concealed portion of the panel;

providing a receiver in the first mold member, the receiver movable between a first molding position and a second receiving position, wherein in the first molding position, a receiver surface is adjacent the appearance-forming surface of the first mold member;

providing a punch in the second mold member forming surface;

injecting molded-in-color resin in the mold;

forming the resin into a solid molded-in-color interior vehicle panel such that the interior panel does not have any apertures along the appearance portion of the panel;

partially cooling the molded-in-color resin;

punching at least one aperture through the partially cooled molded-in-color resin in the mold with the punch; and receiving the punch in the receiver wherein the receiver is provided with at least one shoulder to stop linear translation of the punch in the receiver in order to maintain ideal surface characteristics of the appearance portion of the panel so that the appearance portion of the panel is generally free of visible appearance defects.

4. The method of claim 3 further comprising:
providing the punch in the second mold member adjacent the concealed-forming surface.

5. The method of claim 3 wherein the second mold member translates relative to the first mold member to collectively receive a heated resin with a molded-in-color to form the vehicle panel; and wherein the punch is actuatable to extend through the concealed-forming surface of the second mold member and actuates to extend through the appearance-forming surface of the first mold member to nest in the receiver, thereby forming the aperture through the partially cooled vehicle panel.

6. The method of claim 5 wherein after punching the aperture, the method further comprises:
opening the mold; and
ejecting the molded-in-color vehicle panel from the mold.

7. The method of claim 3 further comprising:
positioning the receiver in the first molding position in preparation of injection molding.

8. The method of claim 3 further comprising:
nesting the punch in the receiver, the receiver thereby translating the to the second receiving position, wherein the receiver is provided with at least one shoulder to stop linear translation of the punch and the receiver.

9. A method comprising:
providing a mold having a first mold member having a translatable receiver and a second mold member having a punch;
positioning the receiver in a first position;
punching an aperture through a molded-in-color vehicle panel with the punch while maintaining an appearance-portion thereof generally free of visible defects; and
nesting the punch in the receiver, wherein the receiver is provided with a shoulder to stop linear translation of the receiver and punch.

10. The method of claim 9 wherein in the first position, the receiver forms a portion of an appearance-forming surface of the first mold member.

11. The method of claim 9 further comprising:
injecting molded-in-color resin in the mold; and
partially cooling the molded-in-color resin.

12. The method of claim 9 wherein the second mold member translates relative to the first mold member to collectively receive a heated resin with a molded-in-color to form the vehicle panel; and wherein the punch is provided adjacent a concealed-forming surface of the second mold member, the punch being actuatable to extend through the concealed-forming surface of the second mold member and actuates to extend through the appearance forming surface of the first mold member to nest in the receiver, thereby forming the aperture through the vehicle panel.

13. The method of claim 12 wherein after punching the aperture, the method further comprises:
opening the mold; and
ejecting the molded-in-color vehicle panel from the mold.

14. The method of claim 9 further comprising:
providing a plurality of punches within the second mold member for forming a plurality of apertures through the vehicle panel.

15. The method of claim 14 further comprising:
providing a plurality of corresponding receivers for nesting the plurality of punches in the forming surface of the other of the first or second mold member.

16. The method of claim 9 further comprising:
providing the punch in the second mold member adjacent a concealed-forming surface.

17. The method of claim 1 wherein the second mold member translates relative to the first mold member to collectively receive a heated resin with a molded-in-color to form the vehicle panel; and wherein the punch is provided within the second mold member, the punch being actuatable to extend through a concealed forming surface of the second mold member and actuates to extend through the appearance forming surface of the first mold member to nest in the receiver, thereby forming the aperture through the partially cooled vehicle panel.

18. The method of claim 14 wherein after punching the aperture, the method further comprises:
opening the mold; and
ejecting the molded-in-color vehicle panel from the mold.

* * * * *